Patented Feb. 1, 1938

2,106,745

UNITED STATES PATENT OFFICE 2,106,745

PROCESS FOR THE PREPARATION OF SILICA FOR GLASS BATCHES

Harrison P. Hood, Corning, N. Y., assignor to Corning Glass Works, Corning, N. Y., a corporation of New York No Drawing. Application March 23, 1936, Serial No. 70,545

5 Claims. (Cl. 209—166)

This invention relates to the preparation of silica for glass batches and has for its object the removal of iron impurities therefrom.

In my prior application Serial Number 732,729, filed June 27, 1934, of which this application is a continuation in part, I have disclosed and claimed a method of purifying silica for use in glass batches which comprises introducing the finely pulverized silica into a water solution containing a mineral acid in a flotation cell or cells, adding thereto a flotation oil comprising a sulfur derivative of cresol and agitating the mixture to float off iron impurities. By means of the method there disclosed, I am able to decrease the iron content of the pulverized silica, including metallic iron as well as iron bearing compounds, to the unusually low value of .004% calculated as $Fe_2O_3$. This result is due largely to the cresol derivative which is capable of producing a substantially quantitative separation of the iron when used as a flotation reagent in the above process. A jig or concentration table or magnetic separator may also be employed in conjunction with the flotation apparatus and preferably preliminary thereto whereby the iron content of the silica may be reduced still further to the value of .001% calculated as $Fe_2O_3$.

The present invention comprises the method of treating silica by flotation in which flotation reagents comprising derivatives of naphthalene such as, for example, alpha naphthylamine hydrochloride; beta naphthylamine hydrochloride; naphthalic acid; 1-naphthalamine 4-sulfonic acid; 1-naphthylamine 4,8-disulfonic acid; 2-naphthylamine 4,8-disulfonic acid; 1-naphthylamine 3,6,8-trisulfonic acid and alpha naphthyl isocyanate, are used in lieu of the sulfur derivative of cresol.

I have discovered that the naphthalene derivatives are fully as effective as the cresol derivatives in purifying silica and, when substituted in lieu thereof in the above described method, will cause a substantially quantitative separation of the metallic iron and iron bearing compounds from the silica.

In practicing my invention the pulverized silica is mixed with a water solution of about 1% mineral acid, preferably sulfuric acid or hydrochloric acid, and the mixture is introduced into the flotation apparatus where it is agitated to keep the silica in suspension. Heat is preferably applied by passing into the mixture sufficient steam to maintain the temperature at about 50° C. To the agitated mixture are added the flotation reagents which in the present instance comprise preferably pine oil, in the amount of about one liquid ounce per hundred pounds of silica, and a naphthalene derivative in the amount of about one ounce avoirdupois per hundred pounds of silica. For continuous operation these reagents are added continuously in this ratio to the silica and water mixture as it enters the apparatus. A concentration table or jig may also be employed if desired and should preferably be employed before the flotation process.

After thus being purified, the silica is washed and dried, after which it may be weighed and mixed into the glass batch in the customary manner.

I claim:

1. The method of preparing silica for use in glass batches, which includes introducing the silica into an acid solution, adding thereto a flotation reagent including a naphthylamine compound, agitating the solution in a flotation apparatus to float off the iron impurities, and drying the silica.

2. The method of preparing silica for use in glass batches, which includes introducing silica into an acid solution, adding thereto a flotation reagent including naphthylamine hydrochloride, heating the solution, agitating the heated solution in a flotation apparatus to float off the iron impurities, and drying the silica.

3. The method of preparing silica for use in glass batches, which includes pulverizing the silica, washing the silica on a concentration table to remove iron impurities therefrom, introducing the silica into an acid solution containing a flotation reagent comprising naphthylamine hydrochloride, agitating the solution in a flotation apparatus to remove the residual iron impurities which remain after the concentration treatment, and drying the silica.

4. The method of preparing silica for use in glass batches, which includes pulverizing the silica, washing the silica on a concentration table to remove iron impurities therefrom, introducing the silica into an acid solution containing a flotation reagent comprising pine oil and naphthylamine hydrochloride, agitating the solution in a flotation apparatus to remove the residual iron impurities which remain after the concentration treatment, and drying the silica.

5. The method of preparing silica for use in glass batches, which includes introducing the silica into an acid solution, adding thereto a flotation reagent including a naphthalene derivative of the group consisting of alpha naphthylamine hydrochloride, beta naphthylamine hydrochloride, naphthalic acid, 1-naphthylamine 4-sulfonic acid, 1-naphthylamine 4,8-disulfonic acid, 2-naphthylamine 4,8-disulfonic acid, 1-naphthylamine 3,6,8-trisulfonic acid and alpha naphthyl isocyanate, agitating the solution in a flotation apparatus to float off the iron impurities, and drying the silica.

HARRISON P. HOOD.